United States Patent
Blum et al.

(10) Patent No.: US 7,843,826 B2
(45) Date of Patent: Nov. 30, 2010

(54) AUTOMATIC DETECTION AND RE-CONFIGURATION OF PRIORITY STATUS IN TELECOMMUNICATIONS NETWORKS

(75) Inventors: Paul Blum, Highlands Ranch, CO (US); Jean Meloche, Madison, NJ (US); John R. Tuck, Jr., Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 96 days.

(21) Appl. No.: 12/267,057

(22) Filed: Nov. 7, 2008

(65) Prior Publication Data

US 2010/0118700 A1    May 13, 2010

(51) Int. Cl.
*H04J 3/14* (2006.01)
*H04L 12/28* (2006.01)

(52) U.S. Cl. ............... 370/230.1; 370/235; 370/395.21; 370/395.43

(58) Field of Classification Search ........................ None
See application file for complete search history.

(56) References Cited

U.S. PATENT DOCUMENTS

| | | | | |
|---|---|---|---|---|
| 2003/0233464 A1* | 12/2003 | Walpole et al. | ............. | 709/231 |
| 2005/0047333 A1* | 3/2005 | Todd et al. | .................. | 370/229 |
| 2005/0207443 A1* | 9/2005 | Kawamura et al. | .......... | 370/469 |
| 2006/0227713 A1 | 10/2006 | Zuberi et al. | | |
| 2007/0076605 A1 | 4/2007 | Cidon et al. | | |
| 2007/0206579 A1* | 9/2007 | Voith et al. | .................. | 370/356 |
| 2007/0268841 A1* | 11/2007 | Dube et al. | ................. | 370/254 |
| 2008/0310428 A1* | 12/2008 | Lei et al. | .................... | 370/400 |
| 2009/0016282 A1* | 1/2009 | Gasparroni et al. | ......... | 370/329 |
| 2009/0086645 A1* | 4/2009 | Hedayat et al. | ............. | 370/250 |

OTHER PUBLICATIONS

Cullen, Dr. John, "GB Application No. GB0916731.3 Search Report Jan. 18, 2010", , Publisher: UK IPO, Published in: GB.

* cited by examiner

*Primary Examiner*—Chi H Pham
*Assistant Examiner*—Soon-Dong D Hyun
(74) *Attorney, Agent, or Firm*—DeMont & Breyer, LLC

(57) ABSTRACT

A technique for ensuring that a node that carries high-priority protocol data units and low-priority protocol data units is properly configured to accord the high-level protocol data units priority treatment is described. In accordance with the illustrative embodiment, two streams of protocol data units are transmitted through a node to be tested. One stream comprises high-priority protocol data units, and the second stream comprises low-priority protocol data units. The processing capabilities of the node are then burdened by increasing the frequency of protocol data units transmitted to it, so that the node is compelled to treat the two streams differently, if, in fact, it is properly configured to treat them differently. If the node treats the two streams differently and accords the high-priority stream higher priority, then the node is properly configured. Otherwise, the node is re-configured to accord the high-priority stream higher priority.

14 Claims, 2 Drawing Sheets

AUTOMATIC DETECTION AND RE-CONFIGURATION OF PRIORITY STATUS IN TELECOMMUNICATIONS NETWORKS

FIELD OF THE INVENTION

The present invention relates to communications networks in general, and, more particularly, to tools for network monitoring and analysis.

BACKGROUND OF THE INVENTION

When content is transmitted via the Internet, the source chops up the content into smaller, more manageable pieces called "protocol data units." Examples of protocol data units include, but are not limited to, packets, datagrams, frames, bytes, etc, depending on the protocol used. The protocol data units are then transmitted to the destination where they are re-assembled into the original content.

When a node in the Internet is overwhelmed, it is common for some of the protocol data units to be lost or delayed in transmission. When a protocol data unit is lost, the destination can arrange for the source to re-transmit the lost protocol data unit. When the re-transmitted protocol data unit arrives at the destination, it appears to the end-user as if the protocol data unit were merely delayed.

Some content, like e-mail, is temporally robust and largely insensitive to the delay of protocol data units. In contrast, some content, like Voice-over-Internet-Protocol ("VoIP") telephony, cannot tolerate large delays.

This discrepancy has lead to a system in which a protocol data unit that carries temporally-sensitive content can request high priority treatment by the Internet. In accordance with this system, each high-priority protocol data unit carries a priority identifier—such as a number in the protocol data unit's Type-Of-Service header—that identifies the protocol data unit's priority. Then, when a protocol data unit reaches a node in the Internet, the node can read the priority identifier and treat the protocol data unit accordingly.

Unfortunately, a uniform priority identification standard does not exist, and, therefore, each node in the Internet has to be configured individually according to the configuration policy of the service provider who owns it. Such individual configuration is tedious and prone to errors, and those errors can have a serious impact on the Internet's ability to provide Voice-over-Internet-Protocol telephony. Therefore, the need exists for a technique for ensuring that a node that carries high-priority and low-priority protocol data units is properly configured.

One solution in the prior art for detecting improperly configured nodes is to send a stream that comprises both high-priority and low-priority protocol data units through a node and to measure whether the high-priority protocol data units are output by the node faster than the low-priority ones. This solution, however, has its disadvantages.

Therefore, the need remains for a technique for a technique for ensuring that a node that carries high-priority and low-priority protocol data units is properly configured.

SUMMARY OF THE INVENTION

The present invention provides a technique for ensuring that a node that carries high-priority protocol data units and low-priority protocol data units is properly configured to accord the high-level protocol data units priority treatment without some of the costs and disadvantages for doing so in the prior art. In accordance with the illustrative embodiment, two streams of protocol data units are transmitted through a node to be tested. One stream comprises high-priority protocol data units, and the second stream comprises low-priority protocol data units. The processing capabilities of the node are then burdened by increasing the frequency of protocol data units transmitted to it, so that the node is compelled to treat the two streams differently, if, in fact, it is properly configured to treat them differently. If the node treats the two streams differently and accords the high-priority stream higher priority, then the node is properly configured. Otherwise, the node is re-configured to accord the high-priority stream higher priority.

The illustrative embodiment comprises: concurrently transmitting: (1) a first stream of protocol data units through a node in a telecommunications network, wherein the first stream of protocol data units requests a first level of priority, and (2) a second stream of protocol data units through the node in the telecommunications network, wherein the second stream of protocol data units requests a second level of priority that is lower than the first level of priority; and re-configuring the node to accord the first stream of protocol data units a higher level of priority than the second stream of protocol data units when an increase in the frequency of protocol data units through the node causes a drop in a measure of the quality of service of the second stream of protocol data units to be matched by a drop in a measure of the quality of service of the first stream of protocol data units.

DETAILED DESCRIPTION

Figure 1:
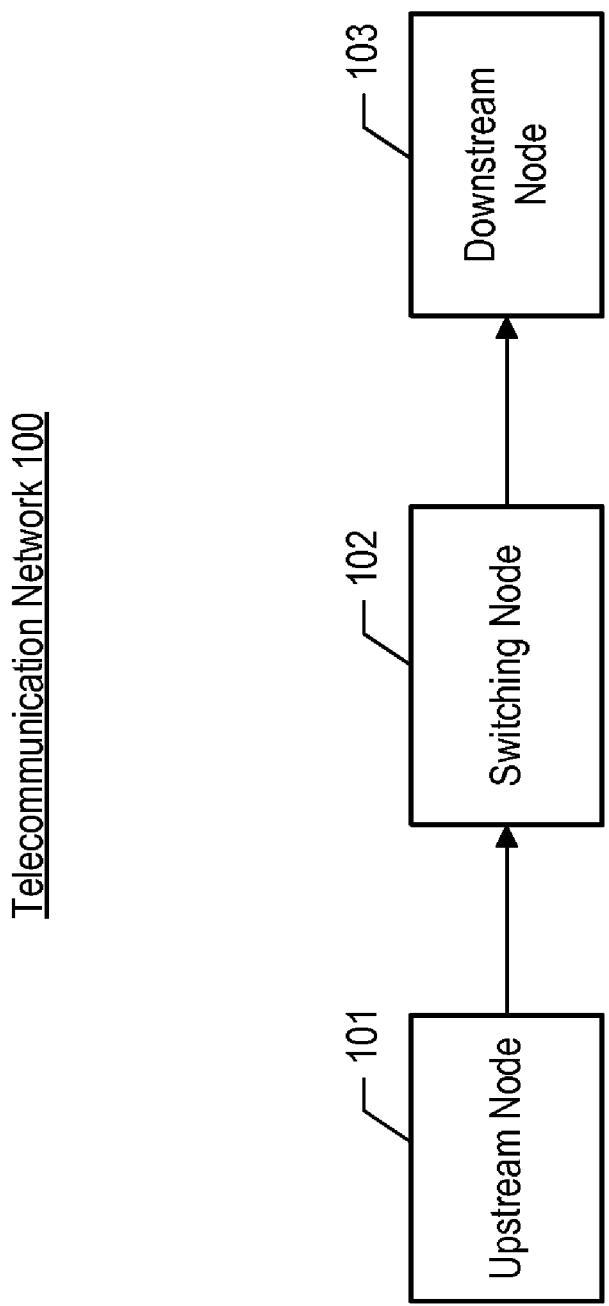
FIG. 1 depicts a schematic diagram of the salient components of telecommunication network 100 in accordance with the illustrative embodiment.

FIG. 1 depicts a schematic diagram of the salient components of telecommunication network 100 in accordance with the illustrative embodiment. telecommunications network 101 comprises: upstream node 101, switching node 102, and downstream node 103, interconnected as shown.

In accordance with the illustrative embodiment, telecommunications network 100 comprises three nodes, but it will be clear to those skilled in the art, after reading this disclosure, how to make and use alternative embodiments of the present invention which comprise any number of nodes in any topology. In accordance with the illustrative embodiment, telecommunications network 100 comprises wireline connections, but it will be clear to those skilled in the art, after reading this disclosure, how to make and use alternative embodiments of the present invention which comprise one or more wireless connections. In accordance with the illustrative embodiment, telecommunications network 100 uses the Transmission Control Protocol/Internet Protocol ("TCP/IP") in the same fashion as the Internet, but it will be clear to those skilled in the art, after reading this disclosure, how to make and use alternative embodiments of the present invention which use any protocols.

Upstream node 101 is hardware and software for concurrently transmitting a plurality of streams of protocol data units to switching node 102 for deliver to downstream node 103.

In accordance with the illustrative embodiment, the first stream of protocol data units transmitted by upstream node 101 carries voice, but it will be clear to those skilled in the art, after reading this disclosure, how to make and use alternative embodiments of the present invention in which the first stream of protocol data units carries something other than voice, for example and without limitation, data, video, software, images, e-mail, etc. In accordance with the illustrative embodiment, the first stream of protocol data units is encoded as a "high-priority" stream, which is a request for switching node 102 to accord the first stream a high level of priority. In accordance with the illustrative embodiment, the first stream of protocol data units uses the Real-Time Transport Protocol and the encoding of the high level of priority is accomplished by modifying the Differentiated Services field of the headers in the protocol data units. However, it will be clear to those skilled in the art, after reading this disclosure, how to make and use alternative embodiments of the present invention in which the first stream of protocol data units uses another protocol and in which the high level of priority is accomplished through another means.

In accordance with the illustrative embodiment, the second stream of protocol data units transmitted by upstream node 101 carries e-mail, but it will be clear to those skilled in the art, after reading this disclosure, how to make and use alternative embodiments of the present invention in which the second stream of protocol data units carries something other than voice, for example and without limitation, data, video, software, images, voice, etc. In accordance with the illustrative embodiment, the second stream of protocol data units is a "low-priority" stream, which is an implicit request for switching node 102 to accord the second stream a lower level of priority than the first stream. In accordance with the illustrative embodiment, the second stream of protocol data units uses the User Datagram Protocol. However, it will be clear to those skilled in the art, after reading this disclosure, how to make and use alternative embodiments of the present invention in which the second stream of protocol data units uses another protocol and in which the lower level of priority is accomplished through another means.

When the processing capabilities of switching node 102 are not burdened, switching node 102 can be expected to process the first stream of protocol data units and the second stream of protocol data units with equal efficiency. It is only when the processing capabilities of switching node 102 are burdened that a disparity in the processing of the first stream and the second stream can be detected. Therefore, the illustrative embodiment comprises a mechanism for ensuring that the processing capabilities of switching node 102 are burdened. In accordance with the illustrative embodiment, upstream node 101 ensures that the processing capabilities of switching node 102 are burdened by being capable of increasing the frequency of protocol data units transmitted to switching node 102 to the point where switching node 102 will exhibit the differential treatment of the first and second streams, if, in fact, switching node 102 treats the streams differently.

For the purposes of this specification, the frequency of protocol data units transmitted is defined as the number of protocol data units transmitted per second. In accordance with the illustrative embodiment, upstream node 101 increases the frequency of protocol data units transmitted to switching node 102 by increasing the frequency of the second stream of protocol data units. However, it will be clear to those skilled in the art, after reading this disclosure, how to make and use alternative embodiments of the present invention in which upstream node 101 increases the frequency of protocol data units transmitted to switching node 102 in another way, for example and without limitation, by:

i. increasing the frequency of the first stream of protocol data units, or ii. increasing the frequency of the second stream of protocol data units, or iii. increasing the frequency of a third stream of protocol data units, or iv. any combination of i, ii, and iii.

Switching node 102 is hardware and software that is capable of receiving a plurality of streams from upstream node 101, of processing the respective streams in accordance with their associated priority, and transmitting the streams to downstream node 103. It will be clear to those skilled in the art how to make and use switching node 102.

Downstream node 103 is hardware and software that is capable of receiving the plurality of streams from switching node 102 and of analyzing their respective quality of service parameters. For the purposes of this specification, the quality of service parameters are defined as:

i. bandwidth and its time derivatives, or ii. latency and it's time derivatives (i.e., "jitter"), or iii. error rate and its time derivatives, or iv. any combination of i, ii, and iii.

It will be clear to those skilled in the art how to make and use downstream node 103.

Figure 2:
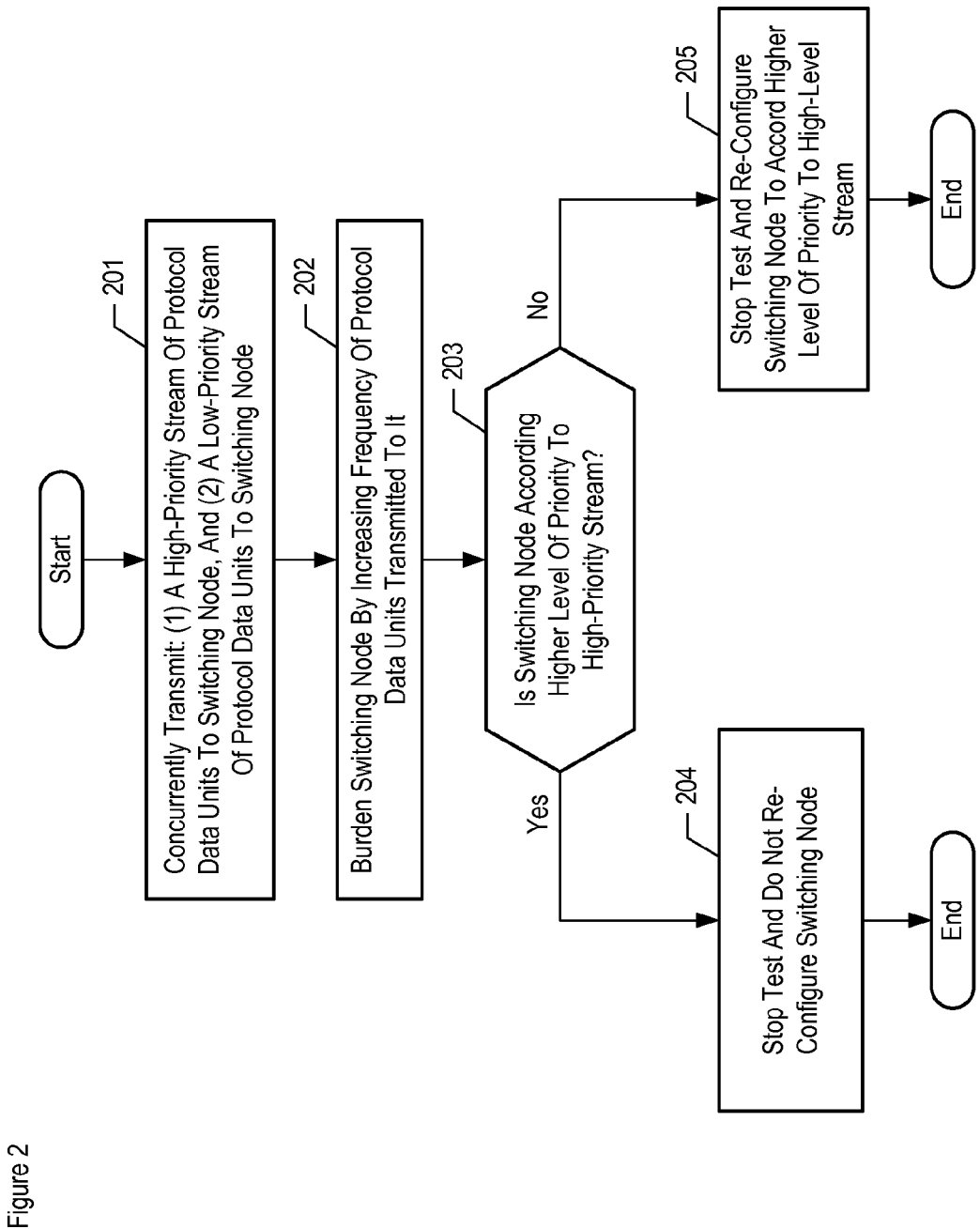
FIG. 2 depicts a flowchart of the salient tasks performed by the illustrative embodiment of the present invention.

FIG. 2 depicts a flowchart of the salient tasks performed by the illustrative embodiment of the present invention.

At task 201, upstream node 101 concurrently transmits: (1) the first stream of protocol data units, which is the high-priority stream, and (2) the second stream of protocol data units, which is the low-priority stream. In accordance with the illustrative embodiment, the frequency of the first and second streams in combination are substantially less than the expected processing capability of switching node 102.

At task 202, upstream node 101 increases the frequency of protocol data units transmitted to switching node 102 to ensure than switching node 102 is burdened to the point where switching node 102 will exhibit the differential treatment of the first and second streams, if, in fact, switching node 102 treats the streams differently.

At task 203, downstream node 103 determines whether switching node 102 is according the first stream a higher level of priority than the second stream. As part of task 203, downstream node 103 measures the quality of service of the first and second streams as it receives them and decides if a drop in a measure of the quality of service of the second stream of protocol data units is matched by a drop in a measure of the quality of service of the first stream of protocol data units. If it is matched, then downstream node 103 determines that switching node 102 is failing to accord the first stream a higher level of priority than the second stream and control passes to task 205; otherwise, control passes to task 204.

In some alternative embodiments of the present invention, downstream node 103 measures the quality of service of the first and second streams as it receives them and decides if a drop in a measure of the quality of service of the first stream of protocol data units falls below a measure of the quality of service of the second stream of protocol data units. If it does, then downstream node 103 determines that switching node 102 is failing to accord the first stream a higher level of priority than the second stream and control passes to task 205; otherwise, control passes to task 204.

At task 204, upstream node 101 ceases to transmit the first and second streams and nothing is done to switching node 102 because it is functioning properly.

At task 205, upstream node 101 ceases to transmit the first and second streams and switching node 102 is re-configured to accord a higher level of priority to high priority streams.

What is claimed is:

1. A method comprising:
   concurrently transmitting:
   (1) a first stream of protocol data units through a node in a telecommunications network, wherein the first stream of protocol data units requests a first level of priority, and
   (2) a second stream of protocol data units through the node in the telecommunications network, wherein the second stream of protocol data units requests a second level of priority that is lower than the first level of priority; and
   re-configuring the node to accord the first stream of protocol data units a higher level of priority than the second stream of protocol data units when an increase in the frequency of protocol data units through the node causes a drop in a measure of the quality of service of the second stream of protocol data units to be matched by a drop in a measure of the quality of service of the first stream of protocol data units.

2. The method of claim 1 wherein the measure of quality of service of the first stream of protocol data units is delay, and wherein the measure of quality of service of the second stream of protocol data units is delay.

3. The method of claim 1 wherein the measure of quality of service of the first stream of protocol data units is jitter, and wherein the measure of quality of service of the second stream of protocol data units is jitter.

4. The method of claim 1 wherein the measure of quality of service of the first stream of protocol data units is error rate, and wherein the measure of quality of service of the second stream of protocol data units is error rate.

5. The method of claim 1 wherein the first stream of protocol data units requests a first level of priority by modifying a Differentiated Services field in at least one of the protocol data units.

6. The method of claim 1 wherein the first stream of protocol data units uses the RTP protocol.

7. The method of claim 1 wherein the second stream of protocol data units uses the UDP protocol.

8. A method comprising:
   concurrently transmitting:
   (1) a first stream of protocol data units through a node in a telecommunications network, wherein the first stream of protocol data units requests a first level of priority, and
   (2) a second stream of protocol data units through the node in the telecommunications network, wherein the second stream of protocol data units requests a second level of priority that is lower than the first level of priority; and
   re-configuring the node to accord the first stream of protocol data units a higher level of priority than the second stream of protocol data units when an increase in the frequency of protocol data units through the node causes a measure of the quality of service of the first stream of protocol data units to fall below a measure of the quality of service of the second stream of protocol data units.

9. The method of claim 8 wherein the measure of quality of service of the first stream of protocol data units is delay, and wherein the measure of quality of service of the second stream of protocol data units is delay.

10. The method of claim 8 wherein the measure of quality of service of the first stream of protocol data units is jitter, and wherein the measure of quality of service of the second stream of protocol data units is jitter.

11. The method of claim 8 wherein the measure of quality of service of the first stream of protocol data units is error rate, and wherein the measure of quality of service of the second stream of protocol data units is error rate.

12. The method of claim 8 wherein the first stream of protocol data units requests a first level of priority by modifying a Differentiated Services field in at least one of the protocol data units.

13. The method of claim 8 wherein the first stream of protocol data units uses the RTP protocol.

14. The method of claim 8 wherein the second stream of protocol data units uses the UDP protocol.

* * * * *